United States Patent
Ramalingam et al.

(10) Patent No.: US 12,360,757 B2
(45) Date of Patent: Jul. 15, 2025

(54) UPGRADING A TARGET SYSTEM IN A CONTINUOUS INTEGRATION SYSTEM

(71) Applicant: Salesforce, Inc., San Francisco, CA (US)

(72) Inventors: Raj Ramalingam, San Francisco, CA (US); Kishore Reddipalli, San Francisco, CA (US); Varun Srinivas, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/565,227

(22) Filed: Dec. 29, 2021

(65) Prior Publication Data

US 2023/0205510 A1    Jun. 29, 2023

(51) Int. Cl.
  *G06F 8/65* (2018.01)
  *G06F 8/61* (2018.01)
  *G06F 8/71* (2018.01)

(52) U.S. Cl.
  CPC .......... *G06F 8/65* (2013.01); *G06F 8/61* (2013.01); *G06F 8/71* (2013.01)

(58) Field of Classification Search
  CPC .......... G06F 8/65; G06F 8/61; G06F 8/71
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |

(Continued)

*Primary Examiner* — Jae U Jeon
(74) *Attorney, Agent, or Firm* — Nicholson De Vos Webster & Elliott LLP

(57) ABSTRACT

In an example, an apparatus may operate as a continuous delivery (CD) pipeline for application artifacts running on a target software platform. The apparatus may include a processor to operate an application upgrader for the target software platform, the application upgrader to: consume application artifacts from a continuous integration (CI) system, wherein the target software platform runs a version of the application artifacts; obtain a signed manifest output from the CI system, the signed manifest identifying the consumed application artifacts; and compare a signature of the application artifacts from the CI system to a signature of the version running on the target software platform to determine if an update of the version running on the target software platform is required. Other embodiments may be disclosed and/or claimed.

20 Claims, 6 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,328,065 B1* | 5/2022 | Wall .................. G06F 21/51 |
| 11,550,568 B1* | 1/2023 | Wall .................... G06F 8/71 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0083757 A1* | 4/2007 | Nakano .................. G06F 21/10 <br> 713/168 |
| 2007/0179795 A1* | 8/2007 | Ordonez .................. G06Q 10/10 <br> 705/1.1 |
| 2008/0109801 A1* | 5/2008 | Levine ...................... G06F 8/65 <br> 717/171 |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0271779 A1* | 10/2009 | Clark .................. G06F 16/178 707/999.01 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2017/0010955 A1* | 1/2017 | Chacko .................. G06F 8/73 |
| 2017/0269921 A1* | 9/2017 | Martin Vicente ... G06F 11/3668 |
| 2017/0371388 A1* | 12/2017 | Lu .......................... G06F 21/575 |
| 2019/0205121 A1* | 7/2019 | Ericson .............. G06Q 20/3674 |
| 2019/0268420 A1* | 8/2019 | Acharya ............. H04L 63/0823 |
| 2019/0303623 A1* | 10/2019 | Reddy ........................ G06F 8/71 |
| 2020/0104125 A1* | 4/2020 | Pechacek .................. G06F 8/71 |
| 2020/0364348 A1* | 11/2020 | Blass ......................... G06F 8/70 |
| 2021/0019418 A1* | 1/2021 | Peeters ................. G06F 21/572 |
| 2021/0182054 A1* | 6/2021 | Kalika ................ G06F 11/3692 |
| 2021/0208916 A1* | 7/2021 | Wang .................... G06F 16/955 |

\* cited by examiner

UPGRADING A TARGET SYSTEM IN A CONTINUOUS INTEGRATION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to upgrading a target system in a continuation integration (CI) system.

DESCRIPTION OF THE RELATED ART

Some organizations may operate hundreds of services on the public cloud and massive scale operating on hundreds of petabytes of data. The cornerstone for modern software deployments at this scale is the concept of "Immutable Infrastructure". The concept for immutable infrastructure is to build the infrastructure components to an exact set of specifications. If a change to a specification is required, then a whole new set of infrastructure is provisioned based on the updated requirements, and the previous infrastructure is taken out of service.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for upgrading a target system in a CI system.

I. Example System Overview

Figure 1A:
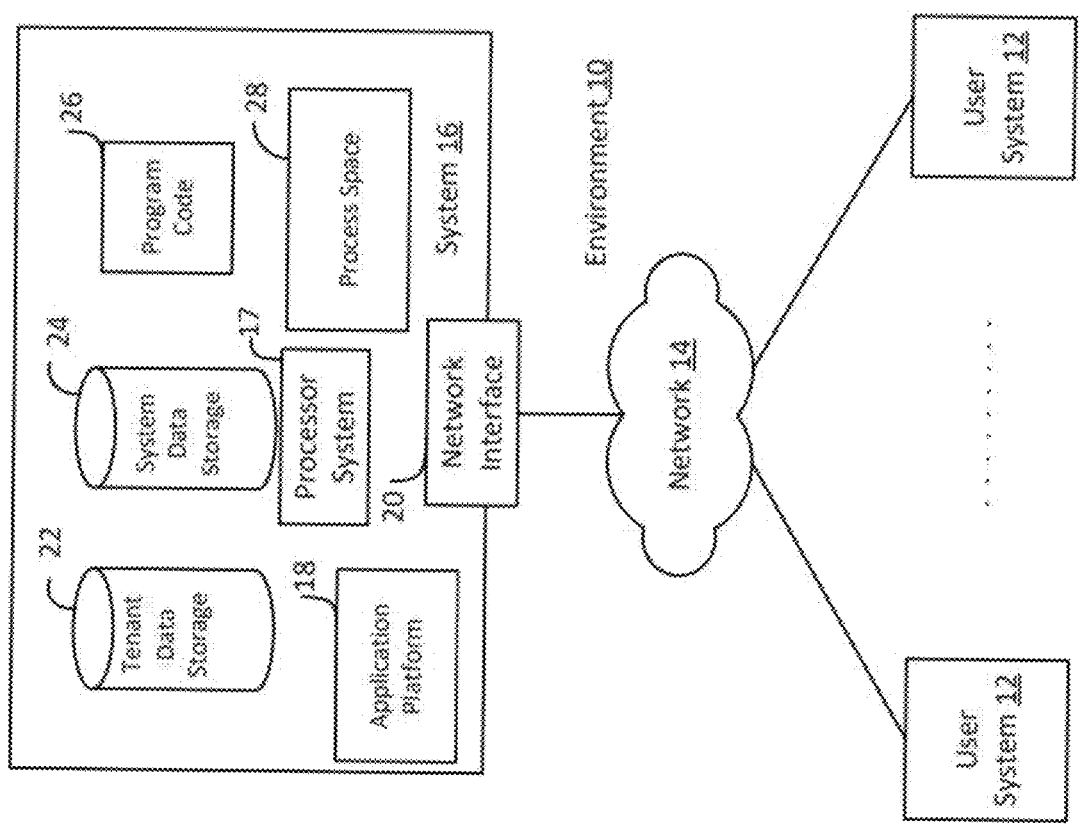
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art.

It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
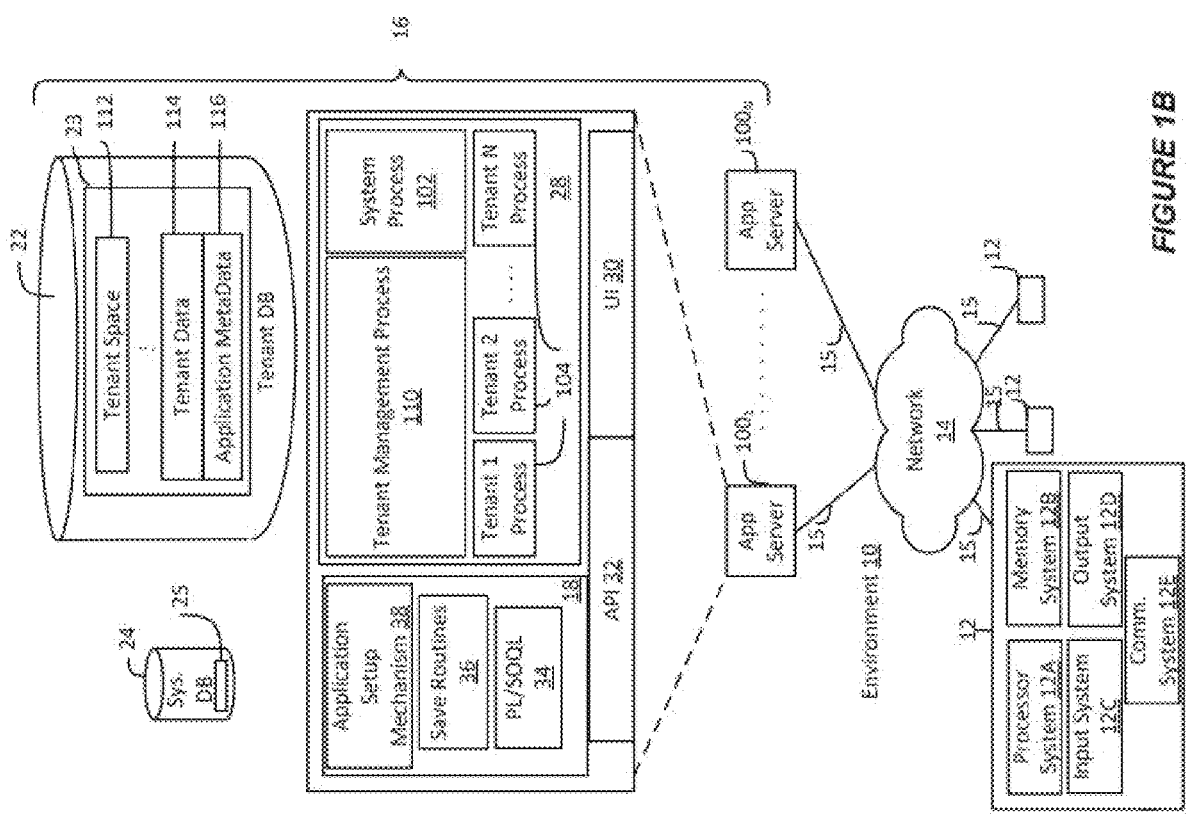
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Upgrading a Target System in a CI System

Connected closely to Immutable Infrastructure are the concepts of Continuous Integration and Delivery. Continuous integration (CI) refers to the practice of developers regularly merging their code into a central code repository which triggers build and tests. The intent in doing so is to improve software quality, and reduce the time it takes to validate and release new software features. The core philosophy of Continuous Delivery (CD) is to deploy a package and it's dependencies the same way every time to ensure that the environment in which the actual code runs remains unaltered. The dependencies are where Immutable Infrastructure comes into play. By pushing the scripted infrastructure build described earlier in conjunction with dependencies may provide stability of the environment being deployed to and eliminate issues caused otherwise.

When it comes to the data development lifecycle, however, it is not always ideal to follow immutable infrastructure principles. Data Science and Data Engineering use cases for example, require a significantly increased cadence in deploying application code. These kinds of use cases need a way to quickly develop, deploy and validate their applications on top of infrastructure deployed using CI/CD principles described above.

Immutable Infrastructure, CI and CD systems need to be augmented with the ability to deliver application level artifacts at a much frequent cadence and with increased agility. Using the former for this kind of a use case is inflexible and is often an overkill. Some organizations may need a mechanism that works in unison with these systems to enable delivery of various kinds of artifacts (code/configurations/binaries) that are not necessarily a part of CI/CD pipelines but work in unison with it. A real-world example is as follows. Data scientists may build various machine learning models and workflows, and deploy them on target systems for training and inference needs. This development process is extremely incremental and repetitive. The process involves cycles of making minor tweaks to the models and deploying/evaluating them. A traditional CI/CD based deployment may slow down this process.

In particular, CD is one of the key aspects of the modern software deployment process. It helps with faster iteration and in conjunction with CI, reduces the possibility of bad code being deployed to production. Most software platforms involve two kinds of software deployments—the base platform software and the application running on the base platform software.

In most deployments today, both these categories of software are treated analogously from a deployment perspective and often deployed as a part of the same CD process. However, the characteristics of these two kinds of software are often disparate. Primary among them are release cadence, deployment footprint, and time taken for deployment. Regarding release cadence, application software generally follows a much frequent release cadence compared to the base platform software. Base platform software is expected to change much less frequently compared to application software and can do with a slower, stringent CD process. Application software, on the other hand, can be deployed up to multiple times each day. Regarding deployment footprint, application software is deployed, updated incrementally and the deployment footprint is expected to be much smaller compared to platform components. Regarding the time taken for deployment, most application software needs to be patched/deployed while the service is still operational and warrants little to no downtime. This coupled with the reduced footprint size means the deployment process needs to be tweaked to reduce service disruption time. Based on the above observations, there is an opportunity to decouple these deployments and develop an improved, more effective CD process for application artifacts.

Figure 2:
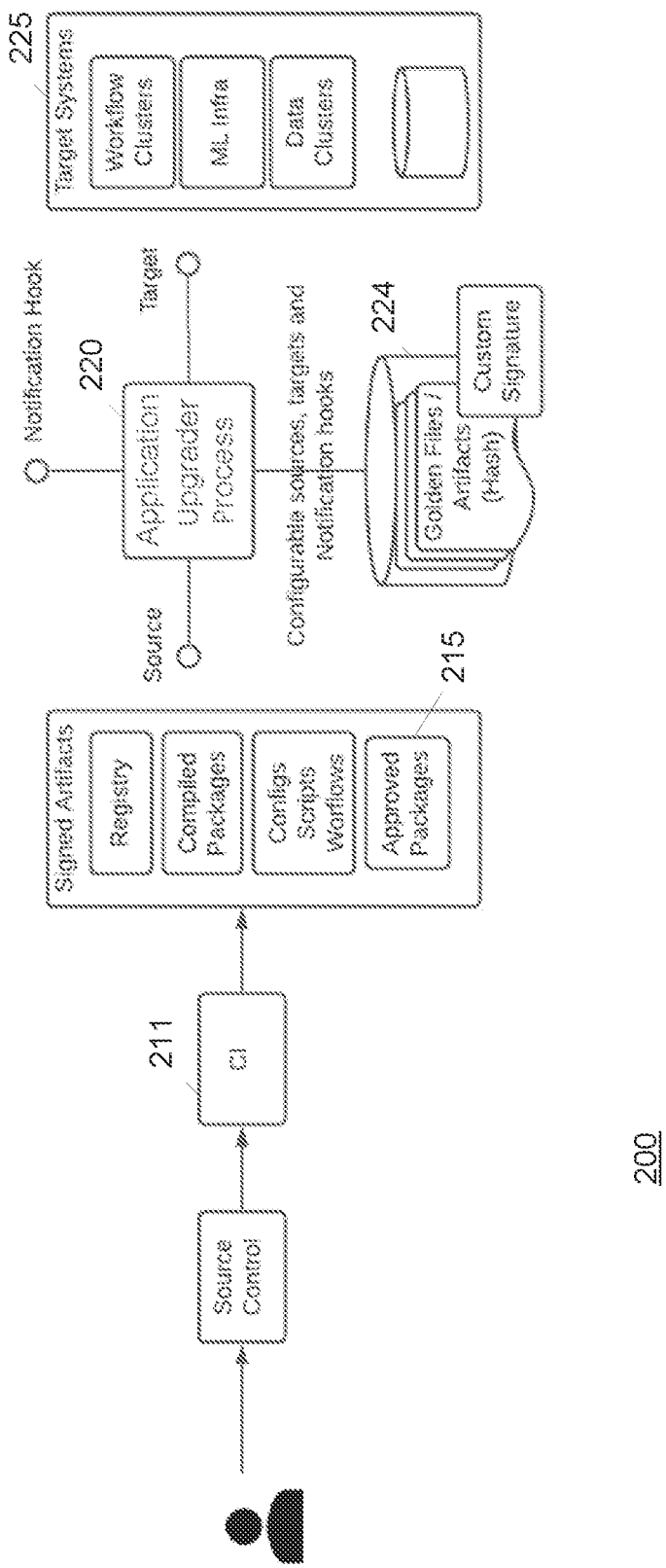
FIG. 2 illustrates a computing system for upgrading a target system in a continuous integration (CI) system, in some embodiments.

FIG. 2 is a schematic diagram of a system 200 for upgrading one or more target systems 225 in a CI system 211. An application upgrader 220 is a software component that provides a way to deploy scripts, workflow, configs, SQLs, ML Models, dependencies, and other artifacts to a variety of data platforms (e.g., target systems 225) by decoupling it from the CI/CD pipelines (e.g., CI system 211) that deliver infrastructure related code. In some embodiments, the application upgrader 220 may run on application platform 18 (FIG. 1A), e.g., as part of Application setup mechanism 38.

In various embodiments, the application upgrader 220 may deliver artifacts from multiple source repositories (e.g., Git) 224 to data platforms they need to run on; dynamically add/remove artifacts delivered; control the version of each artifact delivered; and control where these artifacts are delivered (this could be disk, cloud storage and big data storage systems among others). The application upgrader 220 may be compliant with all requirements enforced by the organization (e.g., credentials scan, static code analysis and open policy agents checks among others), and may ensure only approved and signed artifacts are delivered.

A CI system 311 may be provided to integrate code changes from multiple contributors into a single software project. After one of the contributors checks in 351 in code to the source control system 310 (e.g., Git), the CI system 311 may detect the new event and may consume 352 the code. The CI system 311 may publish 353 signed artifacts to a centralized secure artifact repository 312. The repository 312 may be storage for application artifacts generated by the CI process. The application artifacts may include and are not limited to JARS, RPMs, Images, Compressed Zips. The CI system 311 may store a signed manifest of the artifacts in 354 in cloud bucket 313.

Some organizations may run hundreds of services on kubernetes on the public cloud. These services may backed by two major CI pipelines with each of them serving a specific purpose 1) a fast content pipeline to build code, configuration and other non-binary lightweight artifacts and deliver them to central cloud storage and 2) a docker driven pipeline to build RPMs, jars, tarballs and other relatively bulky artifacts and deliver them as docker images to a central container registry. The application upgrader 220 may hook into each of these pipelines to provide the ability to deliver application level artifacts to data platforms they need to run upon. In one embodiment, the application upgrader 220 may run as a deployment on kubernetes delivering artifacts to a kubernetes cluster and ML/data platforms. In other embodiments, the application upgrader 220 may be deployed as a standalone executable on any software platform.

Referring again to FIG. 2, code checked in by the user flows through a CI system 211 that validates, signs and delivers packages 215 to endpoints such as cloud storage and docker container registries. An application upgrader 220 may be configured to run on the target data platform. As an example, the application upgrader 220 may run as a deployment on kubernetes. The application upgrader 220 may periodically poll the source endpoints to check for new/updated artifacts. The application upgrader 220 may then check the authenticity of incoming artifacts and may generate a custom signature. The application upgrader 220 may then compare the signatures of generated artifacts to the ones running on the target platform and may intelligently update only those artifacts that have changed. The application upgrader 220 may also provide notification hooks to propagate status updates to external systems.

Figure 3:
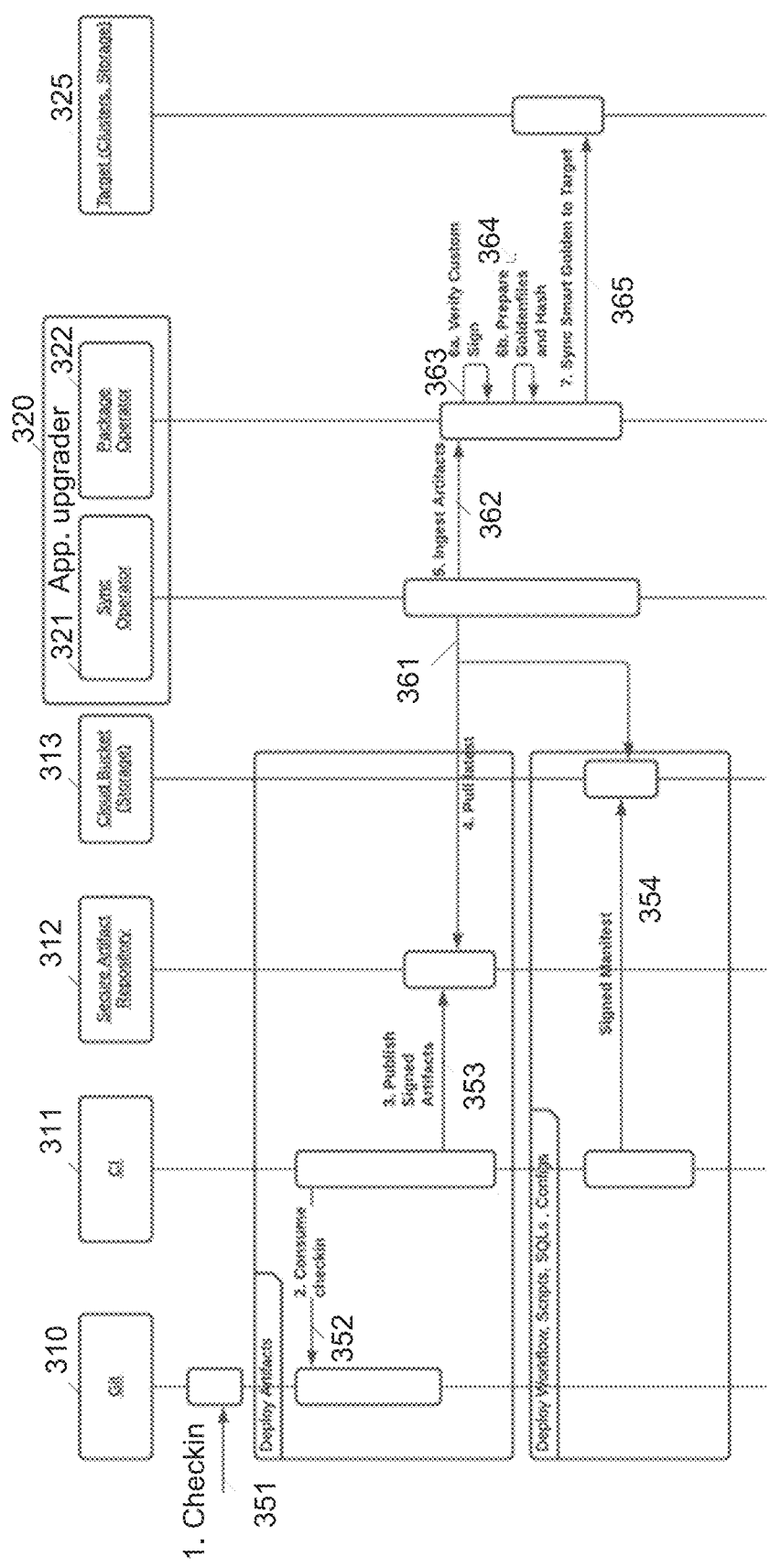
FIG. 3 illustrates a process that may be performed by the computing system of FIG. 2 to upgrade a target system in the CI system, in some embodiments.

FIG. 3 is a sequence diagram illustrating a control flow 300 that may be used in a system similar in any respect to the system 200 of FIG. 2. The control flow 300 is illustrated from the step where an engineer checks in 310 code to the actual deployment 365 to the target platform 325.

A CI system 311 may be provided to integrate code changes from multiple contributors into a single software project. After one of the contributors checks in 351 in code to the source control system 310 (e.g., Git), the CI system 311 may detect the new event and may consume 352 the code. The CI system 311 may publish 353 signed artifacts to a centralized secure artifact repository 312. The repository 312 may be storage for application artifacts generated by the CI process. The application artifacts may include and are not limited to JARS, RPMs, Images, Compressed Zips.

The application upgrader 320 may pull 361 the latest content periodically at regular intervals. The application upgrader 320 may include a synchronization operator module 320 to ingest 362 the most recent content into a processing area.

The application upgrader 320 may also include a package operator 322 to prepare files (e.g., golden files—an inventory of artifacts that are deployed in the platforms) and verify the signature. Application upgrader 320 may verify 363 the incoming artifacts signature to qualify it as a trusted entity. The package operator 322 may prepare 364 an inventory of artifacts and compute the hash for each artifact. The package operator may synchronize 365 golden files to the specified target 325.

Figure 4:
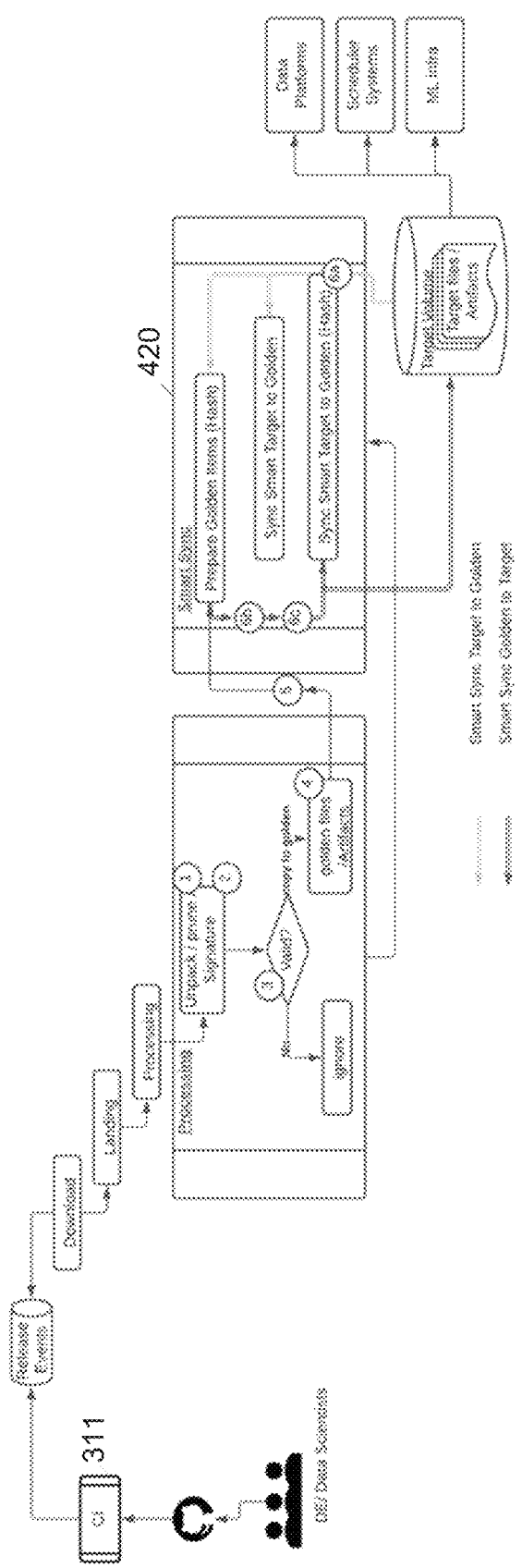
FIG. 4 illustrates a process that may be performed by the application upgrader of FIG. 3 to upgrade a target system in the CI system, in some embodiments.

FIG. 4 illustrates a process 400 that may be performed by the application upgrader 320 of FIG. 3 to upgrade a target system in the CI system 311, in some embodiments. Using the application upgrader 320 may enable shipping artifacts from multiple sources to targets. For example, sources could be one or many of cloud storage, docker container registry while targets could be disks running on kubernetes clusters or cloud storage endpoints.

The application upgrader 320 may not replace contents every time. In multi-tenant data intensive systems, replacing the entirety of artifacts may result in a drastic increase in the load on system components and might often not be necessary. This could result in unintended failures in running workloads on unrelated tenants as well.

In an original release, the application upgrader 320 may prepare an inventory of artifacts along with corresponding hashes, and then may proceed to sync with the cluster. For any subsequent releases, the application upgrader 320 may compare the computed hash values from the inventory of artifacts to artifacts deployed on target systems, and may copy only the delta of changed artifacts.

The release events may carry artifacts that are to be deployed in the target systems. These release events may go through the application upgrader 320 to sync with the targets (target platforms).

The application upgrader 320 may operate as a gateway to target systems. This may allow the administrator to configure an include list of file extensions to apply to the target systems thus providing the ability to selectively deliver components. The application upgrader 320 may be triggered only when a change in signature (and thus contents) of artifacts coming in from CI systems is detected. The application upgrader 320 may provide complete observability, traceability and auditing from source control (git) all the way to what is deployed to the target platform.

In operation 1, the application upgrader 320 may verify the signature/processed area to determine if there is a new event to be processed. In operation 2, artifacts may be unpacked and pruned in the processing stage. This may delete any hidden files/artifacts related to source control systems.

In operation 3, the pruned contents file extensions may be filtered through the allowed file extensions. In operation 4, the existing inventory of artifacts may be replaced by the filtered pruned contents (e.g., the new inventory of artifacts). In operation 5, the pruned contents (artifacts) and hashes may be compared against the target systems contents(artifacts) and hashes.

In operations 6a-c, based on the outcome from the previous operations, the application upgrade 320 may affect the target system through the core logic. In operation 6a, the file/directory gets may get tainted and deleted in the location/cache in the target systems if those contents are not found in the inventory of artifacts (to process delete artifacts). In operation 6b, the new files (artifacts) may be copied over to the target systems from the inventory of artifacts folder (to process new artifacts). In operation 6c, the updated file gets copied over to the target system, and the cached file also gets deleted in some scenarios. In some scenarios, the interpreter compiles the source files to bytecode in some systems and stores them in the cache. As a part of the smart sync process, these cached files may be deleted in addition to updating source files to ensure that the new content is delivered to the sources and all traces of old content is removed.

Figure 5:
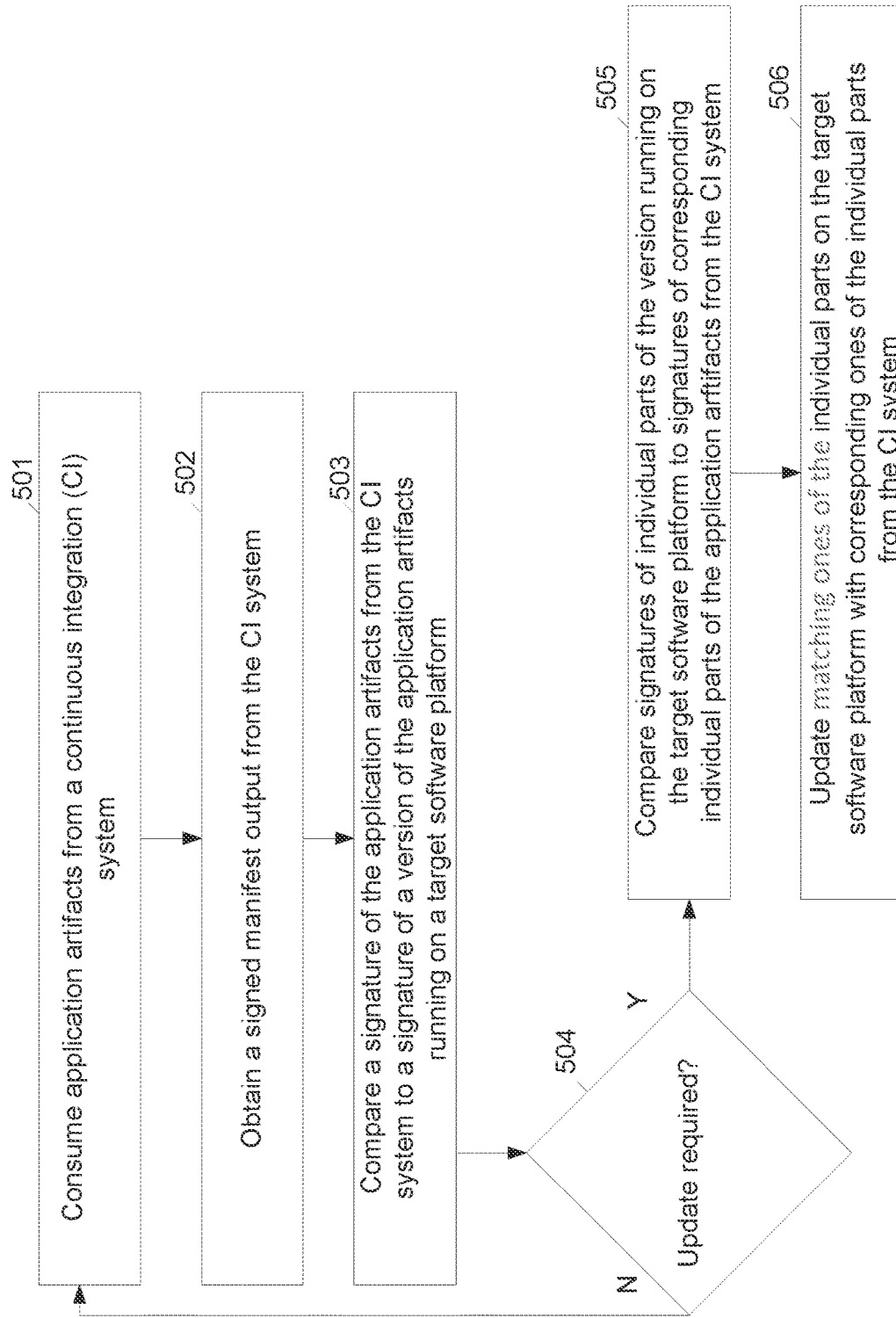
FIG. 5 illustrates a process that may be performed the application upgrader of FIG. 3, in some embodiments.

FIG. 5 illustrates a process that may be performed by the application upgrader of FIG. 3, in some embodiments. In block 501, the application upgrader may consume application artifacts from a continuous integration (CI) system. In block 502, the application upgrader may obtain a signed manifest output from the CI system.

In block 503, the application upgrader may compare a signature of the application artifacts from the CI system to a signature of a version of the application artifacts running on a target software platform. If the signatures do not match (determination that no upgrade is required at this time) in diamond 504, the application upgrader may repeat process 501 and perform an upgrade at another time.

If the signatures do match (determination that an upgrade is required) in diamond 504, the application upgrader may compare signatures of individual parts of the version running on the target software platform to signature of corresponding individual parts of the application artifacts from the CI system in block 505. In block 506, the application upgrader may update matching ones of the individual parts on the target software platform with corresponding ones of the individual parts from the CI system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. An apparatus comprising a memory, to operate as a continuous delivery (CD) pipeline for application artifacts running on a target software platform, the apparatus comprising:
   an application upgrader executed by one or more processors for the target software platform, the application upgrader decoupling a continuous integration (CI) system from the target software platform and configured to:
      periodically retrieve over a network the application artifacts that are stored in one or more artifact repositories, the CI system comprising a first pipeline to build RPMs, jars, tarballs or binary artifacts referred to as base platform artifacts, and a second pipeline to build code, configuration and other non-binary artifacts referred to as the application artifacts, wherein the target software platform runs a version of the application artifacts, and wherein the CI system publishes the base platform artifacts and the application artifacts to the one or more artifact repositories, wherein the second pipeline is a fast content pipeline to delivery application artifacts to central cloud storage, and wherein the first pipeline is a docker driven pipeline to delivery base platform artifacts as docker images to a central container registry;
      generate, for a current version of a first application artifact of the application artifacts, a signature;
      prune the current version of the first application artifact by deleting hidden files to create a pruned application artifact responsive to a determination that an update is required to replace a previously deployed version of the first application artifact running on the target software platform with the current version of the first application artifact based on a comparison of the signature generated for the current version with a signature generated the previously deployed version; and
      update one or more individual parts of the previously deployed version with respective parts of the pruned application artifact responsive to a determination that the one or more individual parts require updating based on a comparison of signatures of individual parts of the previously deployed version with signatures of respective parts of the pruned application artifact.

2. The apparatus of claim 1, wherein the application upgrader is configured to run on a system for automating deployment, scaling, and management of containerized applications.

3. The apparatus of claim 1, wherein the application upgrader is deployed as a standalone executable.

4. The apparatus of claim 1, wherein the application artifacts comprise configuration files or binaries.

5. The apparatus of claim 1, wherein the application upgrader is configured to: retrieve over the network from cloud storage a signed manifest output from the CI system, the signed manifest identifying the application artifacts, wherein the signed manifest is obtained from a cloud storage or a docker registry container.

6. The apparatus of claim 5 wherein the application upgrader is configured to periodically poll source endpoints to check for new application artifacts, wherein the signed manifest is obtained in response to one of the periodic polls.

7. The apparatus of claim 1, wherein the application artifacts comprise JARS, RPMs, Images, or Compressed Zips.

8. The apparatus of claim 1, wherein the application artifact is a machine learning model deployed on the target system for training and/or inference.

9. The apparatus of claim 1, wherein the application updater is configured to perform the generate, compare, prune, determine, and update application artifacts up to multiple times a day.

10. The apparatus of claim 1, wherein the application artifacts running on the target software platform provide services on the public cloud.

11. A method of providing a continuous delivery (CD) pipeline for application artifacts running on a target software platform, the method comprising:
   implementing an application upgrader executed by one or more processors having access to a memory, the application upgrader decoupling a continuous integration (CI) system from the target software platform;
   periodically retrieve over a network the application artifacts that are stored in one or more artifact repositories, wherein the continuous integration (CI) system comprising a first pipeline to build RPMs, jars, tarballs or binary artifacts referred to as base platform artifacts, and a second pipeline to build code, configuration and other non-binary artifacts referred to as the application artifacts, wherein the target software platform runs a version of the application artifacts, and wherein the CI system publishes the base platform artifacts and the application artifacts to the one or more artifact repositories, wherein the second pipeline is a fast content pipeline to delivery application artifacts to central cloud storage, and wherein the first pipeline is a docker driven pipeline to delivery base platform artifacts as docker images to a central container registry;

generate, for a current version of a first application artifact of the application artifact, a signature;

prune the current version of the first application artifact by deleting hidden files to create a pruned application artifact responsive to a determination that an update is required to replace a previously deployed version of the first application artifact running on the target software platform with the current version of the first application artifact based on a comparison of the signature generated for the current version with a signature generated the previously deployed version; and update one or more individual parts of the previously deployed version with respective parts of the pruned application artifact responsive to a determination that the one or more individual parts require updating based on a comparison of signatures of individual parts of the previously deployed version with signatures of respective parts of the pruned application artifact.

12. The method of claim 11, wherein the method is performed using a system for automating deployment, scaling, and management of containerized applications.

13. The method of claim 11, wherein the method is performed by an application upgrader deployed as a stand-alone executable.

14. The method of claim 11, wherein the application artifacts comprise configuration files or binaries.

15. The method of claim 11 further comprising: retrieving over the network from cloud storage a signed manifest output from the CI system, the signed manifest identifying the application artifacts, wherein the signed manifest is obtained from a cloud storage or a docker registry container.

16. The method of claim 15, wherein the retrieving comprises: periodically polling source endpoints to check for new application artifacts, wherein the signed manifest is obtained in response to one of the periodic polls.

17. The method of claim 11, wherein the application artifacts comprise JARS, RPMs, Images, or Compressed Zips.

18. The method of claim 11, wherein the application artifact is a machine learning model deployed on the target system for training and/or inference.

19. The method of claim 11, wherein the application artifact may be updated multiple times a day.

20. The method of claim 11, wherein the application artifacts running on the target software platform provide service.

\* \* \* \* \*